(12) United States Patent
Chen et al.

(10) Patent No.: US 8,199,863 B2
(45) Date of Patent: Jun. 12, 2012

(54) MULTIPLE-ANTENNA SPACE MULTIPLEXING SYSTEM USING ENHANCEMENT SIGNAL DETECTION AND METHOD THEREOF

(75) Inventors: Peng Chen, Beijing (CN); Young-Hak Kim, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 366 days.

(21) Appl. No.: 12/527,644

(22) PCT Filed: Apr. 11, 2008

(86) PCT No.: PCT/KR2008/002054
§ 371 (c)(1),
(2), (4) Date: Aug. 18, 2009

(87) PCT Pub. No.: WO2008/127035
PCT Pub. Date: Oct. 23, 2008

(65) Prior Publication Data
US 2010/0104047 A1    Apr. 29, 2010

(30) Foreign Application Priority Data
Apr. 12, 2007    (CN) .......................... 2007 1 0095891

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........ 375/346; 375/260; 375/341; 375/267; 375/299; 455/296; 455/272; 455/278.1; 455/293

(58) Field of Classification Search .................. 375/346, 375/340, 341, 260, 262, 324, 267, 299; 455/296, 455/272, 278.1, 293
See application file for complete search history.

(56) References Cited

U.S. PATENT DOCUMENTS

| 6,058,105 A | 5/2000 | Hochwald et al. |
| 2001/0036235 A1* | 11/2001 | Kadous .................. 375/341 |
| 2005/0078665 A1 | 4/2005 | Yu et al. |
| 2005/0149596 A1 | 7/2005 | Jeon et al. |

FOREIGN PATENT DOCUMENTS

| JP | 11-168453 | 6/1999 |
| KR | 1020040057686 | 7/2004 |
| WO | WO 02/062002 | 8/2002 |

* cited by examiner

*Primary Examiner* — Phuong Phu
(74) *Attorney, Agent, or Firm* — The Farrell Law Firm, P.C.

(57) ABSTRACT

The multiple-antenna space multiplexing system using enhancement signal detection comprising: a code modulation module for coding and modulating bit information; a signal transmission module for transmitting the modulated signals; a signal reception module for receiving the signals; a signal form transform module for transforming form of a channel matrix H and the received signal vector r; a signal detection module for detecting the received signals; a signal reconstruction module for reconstructing the detection results of in the signal detection module, and obtaining a detected signal; a demodulation decoding module for demodulating and decoding the output of the signal reconstruction module, and outputting bit information. Compared with the conventional detection methods, the system performance is improved in considering the realization complexity.

10 Claims, 3 Drawing Sheets

MULTIPLE-ANTENNA SPACE MULTIPLEXING SYSTEM USING ENHANCEMENT SIGNAL DETECTION AND METHOD THEREOF

BACKGROUND OF THE INVENTION

1. Field of the Invention

This invention relates to transmission of information in a multiple-antenna communication system, especially relates to a technology of transmission and detection for a multiple-antenna signal.

2. Description of the Related Art

With limited spectrum resources, data transmission rate can be improved effectively by using the multiple-antenna space multiplexing BLAST technology.

The existing BLAST detection algorithm may be divided to linear detection (including Zero-Forcing detection (ZF), Minimum Mean Square Error Detection (MMSE) . . . ) and nonlinear detection (including Zero-Forcing and signal Interference Cancellation detection (ZF-SIC), Minimum mean Square Error and signal Interference Cancellation detection (MMSE-SIC) . . . ).

The linear detection method is easy to be realized relatively, while with poor performance. Compared with the linear detection method, the nonlinear detection method may improve the performance of the system. However the significantly increased complexity caused by iterative interference cancellation is the main difficulty for the nonlinear detection to be put into practice.

The following is a simple outline of linear and nonlinear BLAST detection algorithm.

Linear Detection Algorithm

Assuming the received signal is $$r=Hs+n,$$

where, H is a N×M Channel Matrix, s is an M-dimensional transmission signal vector, r is a N-dimensional receipt signal vector, n is a N-dimensional independent white Gaussian noise, M and N are the numbers of system transmitting and receiving antennas.

For Zero-Forcing detection algorithm, $$\hat{s}_{ZF}=(H^HH)^{-1}H^Hr=s+(H^HH)^{-1}H^Hn.$$

For MMSE (Minimum mean square error detection) algorithm, $$\hat{s}_{MMSE}=(H^HH+\sigma^2I)^{-1}H^Hr=s+(H^HH+\sigma^2I)^{-1}H^Hn.$$

where, $\hat{s}_{ZF}$ and $\hat{s}_{MMSE}$ are M-dimensional vectors of detected signals under different algorithms respectively.

Nonlinear Detection Algorithm

Compared with the linear detection, the nonlinear detection technology may improve the system performance effectively at the price of increase of operation complexity.

The following gives an outline of sequential interference cancellation algorithm in the BLAST nonlinear detection algorithm. The basic principle of this algorithm is to remove the interference coming from the detected parts in the process of detecting the current signals, so as to reduce the impact that interference has on data with smaller signal-to-noise ratio. This principle is similar to the decision feedback equalization.

The following describes the detection process:

For ZF-SIC detector, it will defines that $$G_i=H^\dagger=(H^HH)^{-1}H^H,$$

For MMSE-SIC detector, it will defines that $$G_i=H^\dagger=(H^HH+\sigma I)^{-1}H^H.$$

After Process 1, a decision signal may be obtained:

$$k_i=\text{argmin}\|(G_i)_j\|^2 \Rightarrow w_{k_i}=(G_i)_{k_i} \Rightarrow y_{k_i}=w_{k_i}^Tr_i \Rightarrow \hat{a}_{k_i}=Q(y_{k_i}) \quad \text{Process 1}$$

In the above process, $k_1, k_2, \ldots, k_M$ form a sequence of transmitting antennas in the detection process.

Then, Process 2 is performed and the impact of the detected signals has been removed from the received signals. The new pseudo inverse matrix is determined and the new decision sequence is also determined.

$$r_{i+1} = r_i - \hat{a}_{k_i}(H)_{k_i} \Rightarrow G_{i+1} \quad \text{Process 2}$$
$$= H_{i+1}^\dagger \Rightarrow k_{i+1}$$
$$= \underset{j\notin\{k_1 \ldots k_i\}}{\text{argmin}} \|(G_{i+1})_j\|^2 \Rightarrow i \leftarrow i+1$$

Then a cyclical process is formed, and the cyclical process includes Process 1 and Process 2, the cyclical process is carrying out on the signals until i=M. Now, all signals have been determined, and the cyclical process is completed.

The BLAST linear detection method is easy to be realized relatively, while with poor performance. Compared with the linear detection method, the nonlinear detection method can improve the performance of the system. However the significantly increased complexity caused by the iterative interference cancellation is the main difficulty for the nonlinear detection to be put into practice.

SUMMARY OF THE INVENTION

This invention provides a BLAST system using enhancement signal detection. Complexity of this system is close to a BLAST system using a traditional linear detector and the performance of system according to present invention is better than the BLAST system using sequential interference cancellation nonlinear detector.

In order to realize the above object, a multiple-antenna space multiplexing system using enhancement signal detection comprising:

a code modulation module for coding and modulating bit information;

a signal transmission module for transmitting the modulated signals;

a signal reception module for receiving the signals;

a signal form transform module for transforming form of channel matrix H and the received signal vector r;

a signal detection module for detecting the received signals;

a signal reconstruction module for reconstructing the detection results of in the signal detection module, and obtaining a detected signal $\tilde{s}$;

a demodulation decoding module for demodulating and decoding the output of the signal reconstruction module, and outputting bit information.

Compared with the ZF and the ZF SIC detection method, the BER performance of this system in this invention are improved significantly. Compared with the above detection methods, in this invention, this invention has more advantages in considering the system performance, improvement and realization complexity.

DETAILED DESCRIPTION OF THE PREFERRED EMBODIMENTS

Figure 1:
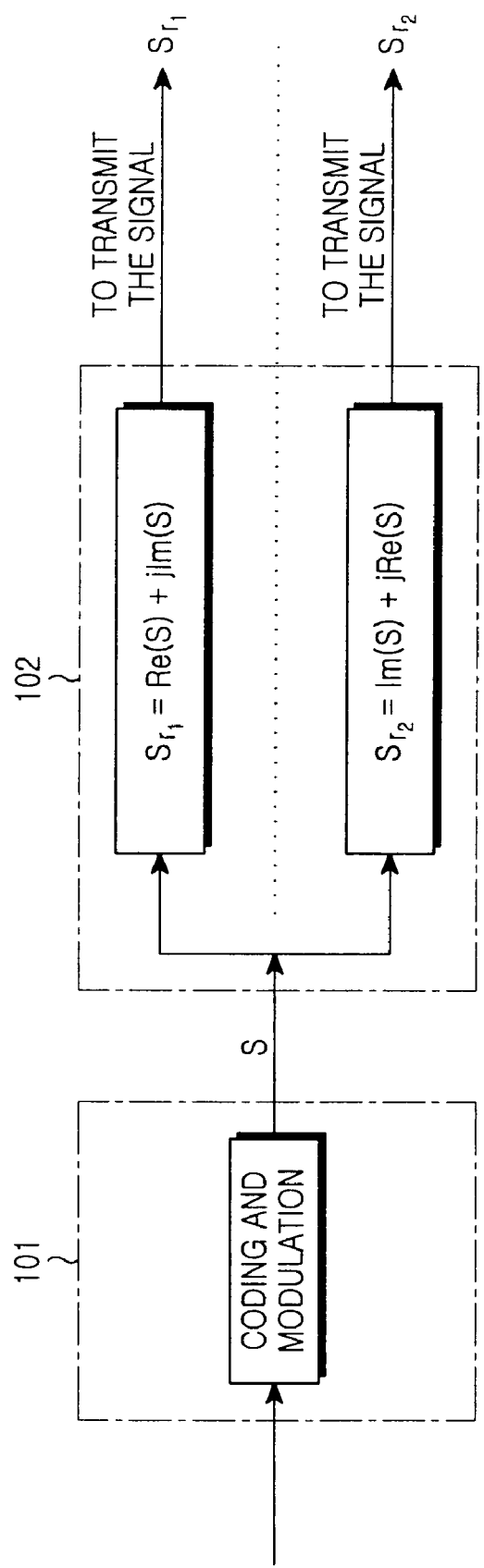
FIG. 1 shows system architecture of transmitting end according to this invention.
Figure 2:
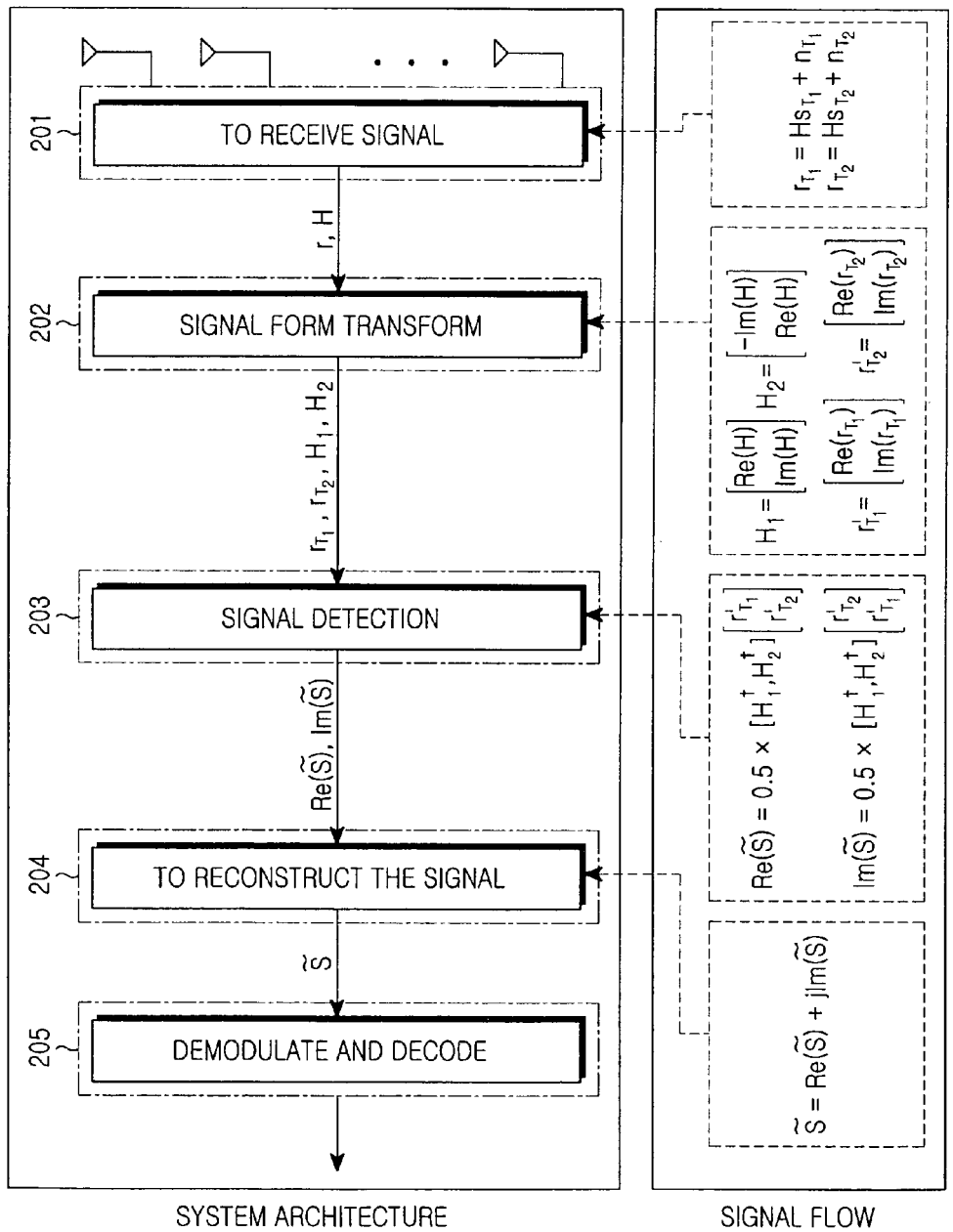
FIG. 2 shows system architecture of receiving end and the signaling flow end according to this invention.
Figure 3:
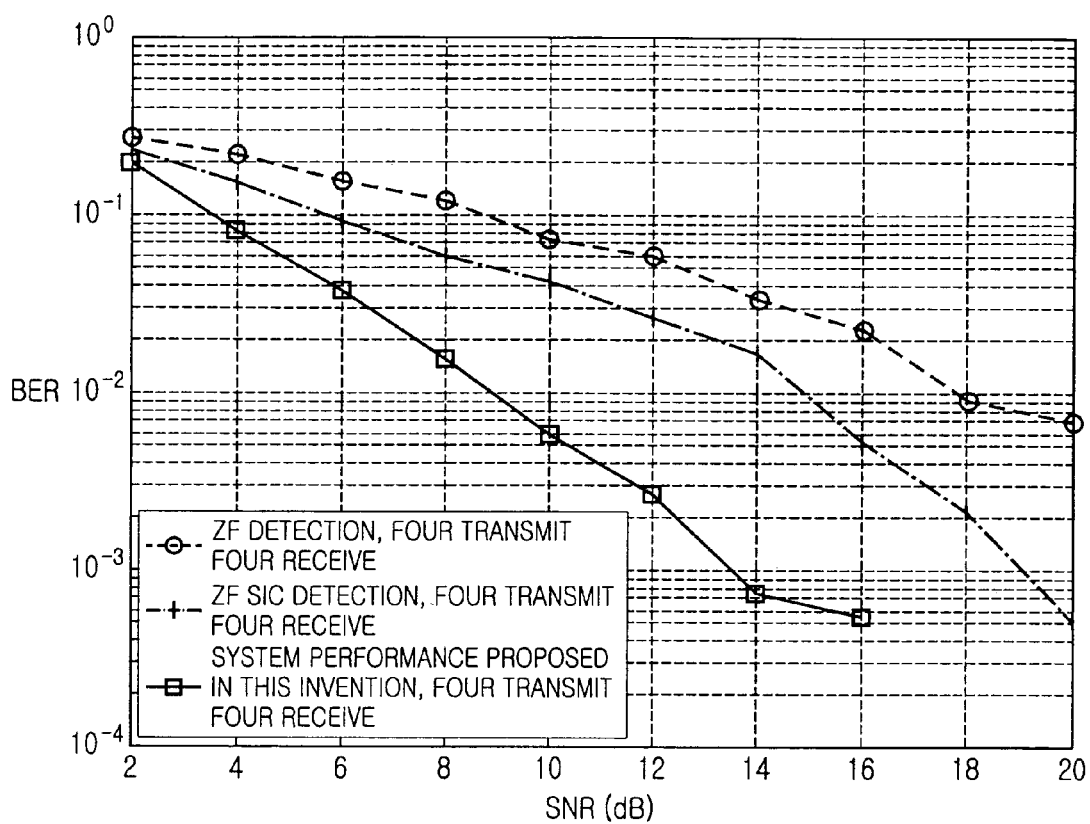
FIG. 3 shows bit error rate (BER) performance.

The system architecture and signaling flow according to this invention are shown in FIG. 1 and FIG. 2.

An outline of this system architecture is described in the followings:

Code modulation module for coding and modulating the bit information.

Signal transmission module for transmitting the modulated signals. The principles of this module consist in that: the signal waiting to be transmitted is s, assuming that quasi-static fading channel H remains the same between adjacent time block $T_1$ and $T_2$. In time block $T_1$, the transmission signal is $s_{T_1}$=Re(s)+jIm(s), in time block $T_2$, the transmission signal is $s_{T_2}$=Im(s)+jRe(s). Re(s) indicates a real part of the complex signal, Im(s) indicates an imaginary part of the complex signal.

Signal reception module for receiving the signals, $r_{T_1}=Hs_{T_1}+n_{T_1}$, $r_{T_2}=Hs_{T_2}+n_{T_2}$.

Signal form transform module for transforming the form of channel matrix H and the received signal vector r:

$$H_1 = \begin{bmatrix} \text{Re}(H) \\ \text{Im}(H) \end{bmatrix}, H_2 = \begin{bmatrix} -\text{Im}(H) \\ \text{Re}(H) \end{bmatrix},$$

$$r'_{T_1} = \begin{bmatrix} \text{Re}(r_{T_1}) \\ \text{Im}(r_{T_1}) \end{bmatrix}, r'_{T_2} = \begin{bmatrix} \text{Re}(r_{T_2}) \\ \text{Im}(r_{T_2}) \end{bmatrix}.$$

Signal detection module for detecting the received signals:

$$\text{Re}(\tilde{s}) = 0.5 \times [H_1^+ \ H_2^+] \begin{bmatrix} r'_{T_1} \\ r'_{T_2} \end{bmatrix}, \text{Im}(\tilde{s}) = 0.5 \times [H_1^+ \ H_2^+] \begin{bmatrix} r'_{T_1} \\ r'_{T_1} \end{bmatrix}.$$

Re($\tilde{s}$) is a real part of the detected signal, Im(s) is an imaginary part of the detected signal.

Signal reconstruction module for reconstructing the signal detection results, then obtaining the detected signal $\tilde{s}$. The reconstruction principle: $\tilde{s}=\text{Re}(\tilde{s})+j\text{Im}(\tilde{s})$.

Demodulation and decoding module for demodulating and decoding the detected signal, then outputting bit information.

According to the above process, in the process of signal detection of this system, a pseudo inverse detection matrix $$\begin{bmatrix} \text{Re}(H) & -\text{Im}(H) \\ \text{Im}(H) & \text{Re}(H) \end{bmatrix}^+$$

in conventional detection algorithms is degenerated to $$\begin{bmatrix} \text{Re}(H) \\ \text{Im}(H) \end{bmatrix}^+ \text{ and } \begin{bmatrix} -\text{Im}(H) \\ \text{Re}(H) \end{bmatrix}^+,$$

which will reduce noise raise in the process of detection obviously. At the same time, compared with the conventional linear detection algorithm, the complexity of this system has not been raised obviously. The complexity is far lower than the sequential interference cancellation nonlinear detection algorithm The following is to prove the rationality of the signaling process in the system according to this invention:

In the following proving process, [ ]$^+$ means matrix pseudo inverse, [ ]$^H$ means matrix transpose conjugate.

At the receiving end, assuming $r_{T_1}=Hs_{T_1}+n_{T_1}$,
$$r_{T_2}=Hs_{T_2}+n_{T_2} \tag{1}$$

Performing equivalent transformation on expression (1)

$$r'_{T_1} = \begin{bmatrix} \text{Re}(r_{T_1}) \\ \text{Im}(r_{T_1}) \end{bmatrix} = \begin{bmatrix} \text{Re}(H) & -\text{Im}(H) \\ \text{Im}(H) & \text{Re}(H) \end{bmatrix} \begin{bmatrix} \text{Re}(s_{T_1}) \\ \text{Im}(s_{T_1}) \end{bmatrix} + \begin{bmatrix} \text{Re}(n_{T_1}) \\ \text{Im}(n_{T_1}) \end{bmatrix} \tag{2}$$

$$= \begin{bmatrix} \text{Re}(H) \\ \text{Im}(H) \end{bmatrix} \text{Re}(s) + \begin{bmatrix} -\text{Im}(H) \\ \text{Re}(H) \end{bmatrix} \text{Im}(s) + \begin{bmatrix} \text{Re}(n_{T_1}) \\ \text{Im}(n_{T_1}) \end{bmatrix}$$

$$r'_{T_2} = \begin{bmatrix} \text{Re}(r_{T_2}) \\ \text{Im}(r_{T_2}) \end{bmatrix} = \begin{bmatrix} \text{Re}(H) & -\text{Im}(H) \\ \text{Im}(H) & \text{Re}(H) \end{bmatrix} \begin{bmatrix} \text{Re}(s_{T_2}) \\ \text{Im}(s_{T_2}) \end{bmatrix} + \begin{bmatrix} \text{Re}(n_{T_2}) \\ \text{Im}(n_{T_2}) \end{bmatrix} \tag{3}$$

$$= \begin{bmatrix} \text{Re}(H) \\ \text{Im}(H) \end{bmatrix} \text{Im}(s) + \begin{bmatrix} -\text{Im}(H) \\ \text{Re}(H) \end{bmatrix} \text{Re}(s) + \begin{bmatrix} \text{Re}(n_{T_2}) \\ \text{Im}(n_{T_2}) \end{bmatrix}$$

Then $$H_1^+ r'_{T_1} = \begin{bmatrix} \text{Re}(H) \\ \text{Im}(H) \end{bmatrix}^+ \begin{bmatrix} \text{Re}(r_{T_1}) \\ \text{Im}(r_{T_1}) \end{bmatrix} \tag{4}$$

$$= \begin{bmatrix} \text{Re}(H) \\ \text{Im}(H) \end{bmatrix}^+ \left( \begin{bmatrix} \text{Re}(H) \\ \text{Im}(H) \end{bmatrix} \text{Re}(s) + \begin{bmatrix} -\text{Im}(H) \\ \text{Re}(H) \end{bmatrix} \text{Im}(s) + \begin{bmatrix} \text{Re}(n_{T_1}) \\ \text{Im}(n_{T_1}) \end{bmatrix} \right)$$

$$= \text{Re}(s) + \begin{bmatrix} \text{Re}(H) \\ \text{Im}(H) \end{bmatrix}^+ \begin{bmatrix} -\text{Im}(H) \\ \text{Re}(H) \end{bmatrix} \text{Im}(s) +$$

$$\begin{bmatrix} \text{Re}(H) \\ \text{Im}(H) \end{bmatrix}^+ \begin{bmatrix} \text{Re}(n_{T_1}) \\ \text{Im}(n_{T_1}) \end{bmatrix}$$

$$H_2^+ r'_{T_1} = \begin{bmatrix} -\text{Im}(H) \\ \text{Re}(H) \end{bmatrix}^+ \begin{bmatrix} \text{Re}(r_{T_1}) \\ \text{Im}(r_{T_1}) \end{bmatrix} \tag{5}$$

$$= \begin{bmatrix} -\text{Im}(H) \\ \text{Re}(H) \end{bmatrix}^+ \left( \begin{bmatrix} \text{Re}(H) \\ \text{Im}(H) \end{bmatrix} \text{Re}(s) + \begin{bmatrix} -\text{Im}(H) \\ \text{Re}(H) \end{bmatrix} \text{Im}(s) + \begin{bmatrix} \text{Re}(n_{T_1}) \\ \text{Im}(n_{T_1}) \end{bmatrix} \right)$$

$$= \begin{bmatrix} -\text{Im}(H) \\ \text{Re}(H) \end{bmatrix}^+ \begin{bmatrix} \text{Re}(H) \\ Im(H) \end{bmatrix} \text{Re}(s) + \text{Im}(s) +$$

$$\begin{bmatrix} -\text{Im}(H) \\ \text{Re}(H) \end{bmatrix}^+ \begin{bmatrix} \text{Re}(n_{T_1}) \\ \text{Im}(n_{T_1}) \end{bmatrix}$$

-continued $$H_1^+ r'_{T_2} = \begin{bmatrix} \text{Re}(H) \\ \text{Im}(H) \end{bmatrix}^+ \begin{bmatrix} \text{Re}(r_{T_2}) \\ \text{Im}(r_{T_2}) \end{bmatrix} \quad (6)$$

$$= \begin{bmatrix} \text{Re}(H) \\ \text{Im}(H) \end{bmatrix}^+ \left( \begin{bmatrix} \text{Re}(H) \\ \text{Im}(H) \end{bmatrix} \text{Im}(s) + \begin{bmatrix} -\text{Im}(H) \\ \text{Re}(H) \end{bmatrix} \text{Re}(s) + \begin{bmatrix} \text{Re}(n_{T_1}) \\ \text{Im}(n_{T_1}) \end{bmatrix} \right)$$

$$= \text{Im}(s) + \begin{bmatrix} \text{Re}(H) \\ \text{Im}(H) \end{bmatrix}^+ \begin{bmatrix} -\text{Im}(H) \\ \text{Re}(H) \end{bmatrix} \text{Re}(s) + \begin{bmatrix} \text{Re}(H) \\ \text{Im}(H) \end{bmatrix}^+ \begin{bmatrix} \text{Re}(n_{T_1}) \\ \text{Im}(n_{T_1}) \end{bmatrix}$$

$$H_2^+ r'_{T_2} = \begin{bmatrix} -\text{Im}(H) \\ \text{Re}(H) \end{bmatrix}^+ \begin{bmatrix} \text{Re}(r_{T_1}) \\ \text{Im}(r_{T_1}) \end{bmatrix} \quad (7)$$

$$= \begin{bmatrix} -\text{Im}(H) \\ \text{Re}(H) \end{bmatrix}^+ \left( \begin{bmatrix} \text{Re}(H) \\ \text{Im}(H) \end{bmatrix} \text{Im}(s) + \begin{bmatrix} -\text{Im}(H) \\ \text{Re}(H) \end{bmatrix} \text{Re}(s) + \begin{bmatrix} \text{Re}(n_{T_1}) \\ \text{Im}(n_{T_1}) \end{bmatrix} \right)$$

$$= \begin{bmatrix} -\text{Im}(H) \\ \text{Re}(H) \end{bmatrix}^+ \begin{bmatrix} \text{Re}(H) \\ \text{Im}(H) \end{bmatrix} \text{Im}(s) + \text{Re}(s) + \begin{bmatrix} -\text{Im}(H) \\ \text{Re}(H) \end{bmatrix}^+ \begin{bmatrix} \text{Re}(n_{T_1}) \\ \text{Im}(n_{T_1}) \end{bmatrix}$$

the following is to prove that $$\begin{bmatrix} \text{Re}(H) \\ \text{Im}(H) \end{bmatrix}^+ \begin{bmatrix} -\text{Im}(H) \\ \text{Re}(H) \end{bmatrix} = - \begin{bmatrix} -\text{Im}(H) \\ \text{Re}(H) \end{bmatrix}^+ \begin{bmatrix} \text{Re}(H) \\ \text{Im}(H) \end{bmatrix} \quad (8)$$

$$\begin{bmatrix} \text{Re}(H) \\ \text{Im}(H) \end{bmatrix}^+ \begin{bmatrix} -\text{Im}(H) \\ \text{Re}(H) \end{bmatrix} = \left( [\text{Re}^H(H) \ \text{Im}^H(H)] \begin{bmatrix} \text{Re}(H) \\ \text{Im}(H) \end{bmatrix} \right)^{-1} \quad (9)$$

$$[\text{Re}^H(H) \ \text{Im}^H(H)] \begin{bmatrix} -\text{Im}(H) \\ \text{Re}(H) \end{bmatrix}$$

$$= [\text{Re}^H(H)\text{Re}(H) + \text{Im}^H(H)\text{Im}(H)]^{-1}$$
$$[-\text{Re}^H(H)\text{Im}(H) + \text{Im}^H(H)\text{Re}(H)]$$

$$\begin{bmatrix} -\text{Im}(H) \\ \text{Re}(H) \end{bmatrix}^+ \begin{bmatrix} \text{Re}(H) \\ \text{Im}(H) \end{bmatrix} = \left( [-\text{Im}^H(H) \ \text{Re}^H(H)] \begin{bmatrix} -\text{Im}(H) \\ \text{Re}(H) \end{bmatrix} \right)^{-1} \quad (10)$$

$$[-\text{Im}^H(H) \ \text{Re}^H(H)] \begin{bmatrix} \text{Re}(H) \\ \text{Im}(H) \end{bmatrix}$$

$$= [\text{Im}^H(H)\text{Im}(H) + \text{Re}^H(H)\text{Re}(H)]^{-1}$$
$$[-\text{Im}^H(H)\text{Re}(H) + \text{Re}^H(H)\text{Im}(H)]$$

Expression (8) may be proved from expression (9) and (10).
Then $$0.5 \times [H_1^+ \ H_2^+] \begin{bmatrix} r'_{T_1} \\ r'_{T_2} \end{bmatrix} = 0.5 \times [H_1^+ r'_{T_1} + H_2^+ r'_{T_2}] \quad (11)$$

$$= 0.5 \times \left( \begin{array}{l} \text{Re}(s) + \begin{bmatrix} \text{Re}(H) \\ \text{Im}(H) \end{bmatrix}^+ \begin{bmatrix} -\text{Im}(H) \\ \text{Re}(H) \end{bmatrix} \text{Im}(s) + \\ \begin{bmatrix} \text{Re}(H) \\ \text{Im}(H) \end{bmatrix}^+ \begin{bmatrix} \text{Re}(n_{T_1}) \\ \text{Im}(n_{T_1}) \end{bmatrix} + \begin{bmatrix} -\text{Im}(H) \\ \text{Re}(H) \end{bmatrix}^+ \\ \begin{bmatrix} \text{Re}(H) \\ \text{Im}(H) \end{bmatrix} \text{Im}(s) + \text{Re}(s) + \\ \begin{bmatrix} -\text{Im}(H) \\ \text{Re}(H) \end{bmatrix}^+ \begin{bmatrix} \text{Re}(n_{T_1}) \\ \text{Im}(n_{T_1}) \end{bmatrix} \end{array} \right)$$

From expression (8) and (11), we may get:

$$\text{Re}(\tilde{s}) = 0.5 \times [H_1^+ \ H_2^+] \begin{bmatrix} r'_{T_1} \\ r'_{T_2} \end{bmatrix} \quad (12)$$

Similarly, $$\text{Im}(\tilde{s}) = 0.5 \times [H_1^+ \ H_2^+] \begin{bmatrix} r'_{T_2} \\ r'_{T_1} \end{bmatrix} \quad (13)$$

The detected signal is $$\tilde{s} = \text{Re}(\tilde{s}) + j\text{Im}(\tilde{s}) \quad (14)$$

This embodiment uses a multiple antenna BLAST communication system consisting of four transmit four receive antennas. The channel is a quasi-static flat Rayleigh fading channel. Assuming channel remains the same between the continuous time block $T_1$ and $T_2$. In the embodiment, the system according to this invention and the BLAST system using ZF detection and ZF SIC detector are all carried out for performance simulation. To ensure a fair performance comparison, on the transmitting end, the system according to this invention uses 16QAM modulation, while ZF and ZF SIC algorithm transmitting end use QPSK modulation.

In the simulation, ⅓ Turbo code is used for coding and decoding in all algorithms.

What is claimed is:

1. A multiple-antenna space multiplexing system using enhancement signal detection comprising:
    a code modulation module (101) for coding and modulating bit information;
    a signal transmission module (102) for transmitting the modulated signals;
    a signal reception module (201) for receiving the signals;
    a signal form transform module (202) for transforming form of a channel matrix H and the received signal vector r;
    a signal detection module (203) for detecting the received signals;
    a signal reconstruction module (204) for reconstructing the detection results of in the signal detection module, and obtaining a detected signal $\tilde{s}$;
    a demodulation decoding module (205) for demodulating and decoding the output of the signal reconstruction module, and outputting bit information,
    wherein the signal transmission module transmits signals as following principles:
    a signal waiting to be transmitted is s, assuming that quasi-static fading channel H remains the same between adjacent time block $T_1$ and $T_2$;
    in time block $T_1$, the transmission signal is $s_{T_1}=\text{Re}(s)+j\text{Im}(s)$;
    in time block $T_2$, the transmission signal is $s_{T_2}=\text{Im}(s)+j\text{Re}(s)$, where Re(s) indicates a real part of complex signal, Im(s) indicates an imaginary part of complex signal.

2. The system according to claim 1, wherein a principle of form transforming of the channel matrix H and the received signal vector r is:

$$H_1 = \begin{bmatrix} \text{Re}(H) \\ \text{Im}(H) \end{bmatrix}, H_2 = \begin{bmatrix} -\text{Im}(H) \\ \text{Re}(H) \end{bmatrix}, r'_{T_1} = \begin{bmatrix} \text{Re}(r_{T_1}) \\ \text{Im}(r_{T_1}) \end{bmatrix}, r'_{T_2} = \begin{bmatrix} \text{Re}(r_{T_2}) \\ \text{Im}(r_{T_2}) \end{bmatrix}.$$

3. The system according to claim 1, wherein a principle for the signal detection module detecting the received signals is:

$$\text{Re}(\tilde{s}) = 0.5 \times [H_1^+ H_2^+] \begin{bmatrix} r'_{T_1} \\ r'_{T_2} \end{bmatrix}, \text{Im}(\tilde{s}) = 0.5 \times [H_1^+ H_2^+] \begin{bmatrix} r'_{T_2} \\ r'_{T_1} \end{bmatrix} \text{Re}(\tilde{s})$$

is a real part of the detected signal, Im($\tilde{s}$) is an imaginary part of the detected signal.

4. The system according to claim 1, wherein a principle for the signal reconstruction module reconstructing the signal detection results is:

$$\text{Im}(\tilde{s}) = 0.5 \times [H_1^+ \ H_2^+] \begin{bmatrix} r'_{T_2} \\ r'_{T_1} \end{bmatrix}.$$

5. The system according to claim 1, wherein the antenna is Multiple Input Multiple Output (MIMO) antenna.

6. A method for transmitting a signal in a multiple-antenna space multiplexing system using enhancement signal detection, comprising:
    coding and modulating, by a code modulation module (101), bit information;
    transmitting, by a signal transmission module (102), the modulated signals;
    receiving, by a signal reception module (201), the signals;
    transforming, by a signal form transform module (202), form of a channel matrix H and the received signal vector r;
    detecting, by a signal detection module (203), the received signals;
    reconstructing, by a signal reconstruction module (204), the detection results of in the signal detection module, and obtaining, by the signal reconstruction module (204) a detected signal $\tilde{s}$;
    demodulating and decoding, by a demodulation decoding module (205), the output of the signal reconstruction module, and outputting, by the demodulation decoding module (205), bit information,
wherein signals are transmitted, by the signal transmission module, as following principles:
    a signal waiting to be transmitted is s, assuming that quasi-static fading channel H remains the same between adjacent time block $T_1$ and $T_2$;
    in time block $T_1$, the transmission signal is $s_{T_1}$=Re(s)+ jIm(s);
    in time block $T_2$, the transmission signal is $s_{T_2}$=Im(s)+ jRe(s), where Re(s) indicates a real part of complex signal, Im(s) indicates an imaginary part of complex signal.

7. The method according to claim 6, wherein a principle of form transforming of the channel matrix H and the received signal vector r is:

$$H_1 = \begin{bmatrix} \text{Re}(H) \\ \text{Im}(H) \end{bmatrix}, H_2 = \begin{bmatrix} -\text{Im}(H) \\ \text{Re}(H) \end{bmatrix}, r'_{T_1} = \begin{bmatrix} \text{Re}(r_{T_1}) \\ \text{Im}(r_{T_1}) \end{bmatrix}, r'_{T_2} = \begin{bmatrix} \text{Re}(r_{T_2}) \\ \text{Im}(r_{T_2}) \end{bmatrix}.$$

8. The method according to claim 6, wherein a principle for the signal detection module detecting the received signals is:

$$\text{Re}(\tilde{s}) = 0.5 \times [H_1^+ H_2^+] \begin{bmatrix} r'_{T_1} \\ r'_{T_2} \end{bmatrix}, \text{Im}(\tilde{s}) = 0.5 \times [H_1^+ H_2^+] \begin{bmatrix} r'_{T_2} \\ r'_{T_1} \end{bmatrix} \text{Re}(\tilde{s})$$

is a real part of the detected signal, Im($\tilde{s}$) is an imaginary part of the detected signal.

9. The method according to claim 6, wherein a principle for the signal reconstruction module reconstructing the signal detection results is:

$$\text{Im}(\tilde{s}) = 0.5 \times [H_1^+ \ H_2^+] \begin{bmatrix} r'_{T_2} \\ r'_{T_1} \end{bmatrix}.$$

10. The method according to claim 6, wherein the antenna is a Multiple Input Multiple Output (MIMO) antenna.

* * * * *